United States Patent Office 2,886,123
Patented May 12, 1959

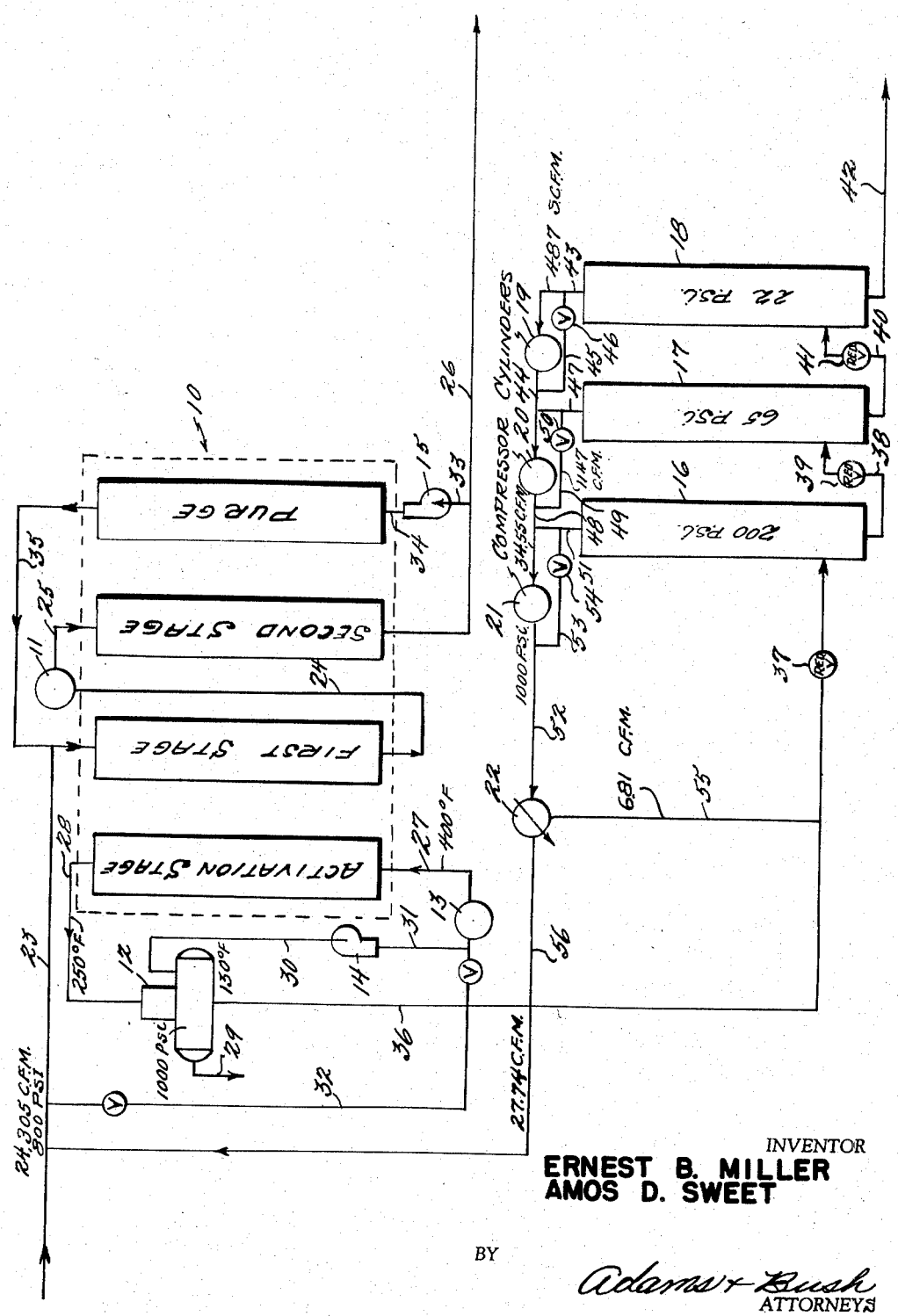

2,886,123

METHOD OF AND APPARATUS FOR FLASH SEPARATING HYDROCARBONS

Ernest B. Miller and Amos D. Sweet, Houston, Tex., assignors to Jefferson Lake Sulphur Company, New Orleans, La., a corporation of New Jersey Application August 24, 1955, Serial No. 530,374

2 Claims. (Cl. 183—4.3)

This invention relates to the recovery of condensable hydrocarbons from fluid mixtures containing hydrocarbons and has more particular reference to a method of and apparatus for recovering stabilized hydrocarbon liquids from high pressure hydrocarbon mixtures.

One object of the present invention is to provide a novel method of and apparatus for recovering stabilized hydrocarbon liquids from high pressure hydrocarbon mixtures.

Another object of the invention is to provide a novel method of and system for recovering stabilized hydrocarbon liquids from high pressure hydrocarbon mixtures including collecting and/or maintaining the high pressure hydrocarbon mixture in a pressure vessel, in liquid form, directing a continuous flow of the liquid mixture from the pressure vessel directly and in succession through a series of flash separators, reducing the pressure of the liquid to a predetermined pressure prior to its entry into each of the flash separators whereby only predetermined volatile components of the liquid mixture will flash off into vapor in each of the separators; withdrawing the overhead vapors from all of the separators, compressing the withdrawn vapors to a pressure equal to the pressure of the hydrocarbon mixture being treated, cooling the withdrawn compressed vapors to condense out any liquid phase formed during compression, returning any condensed liquid to the feed to the first separator, and sending the remaining compressed vapor to further points of use; and continuously withdrawing the liquid from the last of the separators which forms the stabilized hydrocarbon liquid product.

Another object of the invention is to provide a novel method of and system for recovering stabilized hydrocarbon liquids from high pressure hydrocarbon mixtures, as characterized above, wherein the high pressure hydrocarbon mixtures is obtained from natural gas by the use of an adsorber in which the condensable hydrocarbons are adsorbed and subsequently removed and condensed in a high pressure condenser, and wherein the withdrawn compressed overhead vapors from the separators after having any liquid phase formed during compression removed therefrom are introduced along with the natural gas into the adsorber.

Other objects and advantages of the invention will appear in the specification, when considered in connection with the accompanying drawing, in which the figure is a diagrammatic view showing one embodiment of apparatus and the arrangement thereof for carrying out the method of the invention.

The present invention is an improvement over that shown in Miller et al. Patent No. 2,784,798, dated March 12, 1957, and provides a novel and improved method of and apparatus for recovering stabilized hydrocarbon liquids from high pressure hydrocarbon mixtures which have been obtained from natural gas and are maintained in liquid form under high pressure in a pressure vessel such as a condenser.

In general, the present invention consists of a series of three or more flash separators through which the liquid from the high pressure container passes in succession. The conduits through which the liquid passes from the high pressure container to the first separator and from one separator to the next are provided with pressure regulators so that the liquid can be introduced into each separator at a predetermined pressure whereby the volatile components of the liquid which flash off in the separators will be controlled by the predetermined setting of the pressure regulators.

The overhead vapors of all the separators are continuously removed and recompressed, the vapor from the last or lowest pressure separator of the series of separators is compressed to the pressure of the vapor from the preceding separator and combined with that vapor; the combined vapor is then compressed to the pressure of the vapor from the next preceding separator and combined with that vapor; continuing to the first or highest pressure separator in the series. The combined vapors from all the separators are then compressed to the pressure of the high pressure system; cooled to condense out any liquid phase formed during compression; said liquid is combined with the liquid from the high pressure container; and the remaining compressed vapor is sent to further points of use. By proper setting of the pressure regulating valves, thereby controlling the particular volatile components which flash off in each separator, the liquid from the last separator will contain substantially only the desired components in the form of a stabilized product. The invention further contemplates the obtaining of the high pressure hydrocarbon mixtures from natural gas by the use of an adsorber in which the condensable hydrocarbons are adsorbed and subsequently removed and condensed in a high pressure condenser. When an adsorber is employed, the combined withdrawn overhead compressed vapors, after having any liquid phase formed during compression removed therefrom, are reintroduced along with the natural gas, into the adsorber.

Referring now to the drawing, there is schematically shown one embodiment of apparatus and the arrangement thereof for carrying out the method of the present invention. The apparatus shown comprises an adsorber 10 employed to adsorb the hydrocarbons from the gas being treated; an intercooler 11 employed to cool the gas being treated between the first and second adsorption stages of the adsorber; a condenser-separator 12 employed to condense the hydrocarbons contained in the activation gas after it has passed through the reactivation stage of the adsorber; a heater 13 for heating the activation gas; a blower 14 for recirculating the activation gas through the adsorber; a blower 15 for forcing the purging gas through the adsorber; a plurality of flash separators, three such being shown and numbered 16, 17 and 18; compressors 19, 20 and 21 for compressing and combining the flash vapor from the separators; and a condenser 22 for removing any liquids formed during compression.

The adsorber 10 and the auxiliary apparatus employed therewith may be of any suitable usual type such as shown in Patent No. 2,507,608, for Apparatus for Dehydrating Gas and Recovering Condensable Hydrocarbons Therefrom, issued May 16, 1950, to Ernest B. Miller. However, preferably and as illustrated, the adsorber 10 and the auxiliary equipment employed therewith are identical in construction to that shown in the co-pending application of Ernest B. Miller, for Fluid Treating Apparatus, filed January 26, 1954, Ser. No. 406,310, now Patent No. 2,751,033, dated June 19, 1956.

The gas being treated is delivered, at high pressure, from the usual compressor or source of supply (not shown) to the first stage of the adsorber by means of pipe line 23. After passing through the first stage of the adsorber, during which passage some of the condensable hydrocarbons are removed, the gas passes through pipe line 24 into the intercooler 11. From the intercooler, the cooled gas passes through pipe line 25 into the second adsorption stage of the adsorber, wherein additional hydrocarbons are removed, and from the second adsorption stage the gas passes through pipe line 26 to its various points of use.

The removal and recovery of the hydrocarbons from the beds of adsorbent material are effected in the third or activation stage of the adsorber. The activation gas, a captive gas, is heated in the heater 13, where its temperature is raised to from 300° F. to 600° F. From the heater, the heated activation gas passes through pipe line 27 into the activation stage of the adsorber and, as the hot gas passes through the adsorbent material, it removes the hydrocarbons therefrom. From the activation stage, the activation gas, with the hydrocarbon vapor, passes through pipe line 28 into the condenser-separator 12, where the hydrocarbons are condensed and separated from any water which may be present, the water being drained from the bottom of the separator by means of a small drain line 29.

From the condenser-separator, the now stripped captive gas passes through pipe line 30 to the blower 14 and is recirculated by the blower through pipe line 31 and the heater 13 back through the activation stage. This recirculation process is continuous.

The captive stream of gas in the activation system is circulated, by means of the blower 14, through the heater 13, the activation stage of the adsorber, and the condenser-separator 12. The composition of this stream will build up gradually in terms of vapor, composed chiefly of hydrocarbons, until the dew point of the captive gas stream reaches condenser temperature, and will thereafter yield as liquid all of the condensable vapors adsorbed in the reactivation stage of the adsorber.

While it is not necessary to provide outside gas for use as the captive activation gas, in order to speed up the initial operation of the apparatus, it may be desirable to do so. Accordingly, gas may be diverted from the supply line 23, through a pipe line 32, to the pipe line 31 for initial operation.

The gas used as the purging medium may be taken from the pipe line 26 through pipe line 33, passes through blower 15 and then through pipe line 34 into the purging stage of the adsorber. As the purging gas passes through the purging stage, it purges the adsorbent material therein by removing all remaining activation gas and any remaining condensable hydrocarbons deposited on the adsorbent material.

From the purging stage, the purging gas passes through pipe line 35 into the flow of the gas on the way to the first adsorption stage of the adsorber.

From the condenser 12, the liquid hydrocarbons pass through pipe line 36 and a pressure regulator 37, set to reduce the pressure of the liquid to a predetermined pressure, into the first flash separator 16, wherein certain of the most volatile components of the liquid will flash off as vapor. The liquid hydrocarbons in the first flash separator which did not flash into vapor pass through pipe line 38 and a pressure regulator 39, set to reduce the pressure of the liquid to a predetermined pressure, into the second flash separator 17, where certain other of the volatile components of the liquid will flash off as vapor. The liquid hydrocarbons in the second flash separator which did not flash off into vapor pass through pipe line 40 and a pressure regulator 41 set to reduce the pressure of the liquid to a predetermined pressure, into the third flash separator 18, where certain other of the volatile components of the liquid will flash off as vapor. From the bottom of the third flash separator the now stabilized liquid, which forms the finished product, passes through pipe line 42 to a point of storage.

The flashed off vapors from the low pressure separator 18 pass from the top of the separator through pipe line 43 into the compressor 19 and pass through pipe line 44 into the compressor 20. Preferably, and as shown, a bypass pipe line 45 provided with a control or regulating valve 46, connects the pipe lines 43 and 44, the control valve 46 being set for the minimum pressure in the separator 18.

The flashed off vapors from the flash separator 17 pass from the top of the separator through pipe line 47 into pipe line 44, where they are combined with the vapors from the compressor 19 on the way to the compressor 20. The combined vapors from the separators 17 and 18 are compressed in the compressor 20 and pass therefrom through pipe line 48 into the compressor 21. Preferably, and as shown, a bypass pipe line 49, provided with a pressure control valve 50, connects the pipe lines 48 and 47, the control valve 50 being set to the minimum pressure in the separator 17.

The flashed off vapors from the first flash separator 16 pass from the top of the separator through pipe line 51 into pipe line 48, where they are combined with the vapors from the compressor 20 on their way to the compressor 21. The combined vapors from the flash separator 16 and the compressor 20 are compressed in the compressor 21 and pass through pipe line 52 into the condenser 22. Preferably, and as shown, a bypass pipe 53, provided with a pressure control valve 54, connects the pipe lines 51 and 52, the control valve 54 being set for the minimum pressure in the separator 16.

The combined vapors from the three flash separators are compressed in the compressor 21 to the pressure of the high pressure system before passing into the condenser separator 22 and any liquids formed during compression are separated in the condenser separator and pass through pipe line 55 into pipe line 36 to be combined with the high pressure hydrocarbon mixture from condenser 12 on its way to the first flash separator, the vapor passing from the condenser separator through pipe line 56 back into pipe line 23 to be combined with the natural gas entering the adsorber.

The foregoing process may be employed for stabilizing various types of liquid hydrocarbon mixtures which have been removed from natural gas by desorption of the condensable hydrocarbons from the natural gas in the adsorber.

The following table shows the result of calculations made to predict the composition and quantities involved when using the process of this invention to obtain a 22 lb. Reid vapor pressure gasoline from 35 million cubic feet per day of a natural gas flowing at 800 p.s.i., with temperatures, pressures, and rates of flow as indicated on the drawing:

| Press. Temp. | Condenser, 800 p.s.i., 130° F., s.c.f.m., Liquid | 1st Separator, 200 p.s.i., 100° F., s.c.f.m. | | 2d Separator, 65 p.s.i., 100° F., s.c.f.m. | | 3rd Separator, 22 p.s.i., 100° F., s.c.f.m. | |
|---|---|---|---|---|---|---|---|
| | | Vapor | Liquid | Vapor | Liquid | Vapor | Liquid |
| $CO_2$ | 5.17 | 3.30 | 1.87 | 1.14 | .73 | .67 | .16 |
| $C_1$ | 22.28 | 17.35 | 4.93 | 3.70 | 1.23 | 1.07 | .16 |
| $C_2$ | .71 | .30 | .41 | .15 | .26 | .15 | .11 |
| $C_3$ | .32 | .06 | .26 | .04 | .22 | .07 | .15 |
| $iC_4$ | 3.60 | .33 | 3.27 | .25 | 3.02 | .45 | 2.57 |
| $nC_4$ | 5.81 | .41 | 5.40 | .31 | 5.09 | .58 | 4.51 |
| $iC_5$ | 21.70 | .69 | 21.01 | .52 | 20.49 | 1.03 | 19.46 |
| $nC_5$ | 13.21 | .33 | 12.88 | .25 | 12.63 | .49 | 12.14 |
| $C_7+$ | 30.02 | .26 | 29.76 | .20 | 29.56 | .39 | 29.17 |
| $O$ | 14.74 | .05 | 14.69 | .04 | 14.65 | .07 | 14.58 |
| | 117.56 | 23.08 | 94.48 | 6.60 | 87.88 | 4.87 | 83.01 |

The method may also be employed for stabilizing other types of liquid hydrocarbon mixtures, as for example, butanes or propanes. For these other types of liquid products, it will only be necessary to select suitable intermediate pressures at which to make the flash separations, and a final separator pressure which will yield the desired product. The recompression and recycling of the flash vapors is then carried out at the selected flow and pressure conditions.

From the foregoing, it readily is apparent that there has been provided a novel method and system for recovering stabilized hydrocarbon liquids from high pressure hydrocarbon mixtures; a system which is simple in construction, efficient in operation and extremely flexible in its adaptations.

Obviously, the invention is not restricted to the particular embodiment thereof herein shown and described.

What is claimed is:

1. A system for recovering stabilized hydrocarbon liquids from a gas containing condensable hydrocarbons comprising an adsorber; means including conduits for directing a continuous flow of the gas through said adsorber whereby said condensable hydrocarbons will be adsorbed from the gas; means including a heater, a blower and conduits for continuously directing a flow of an activating medium through said adsorber whereby the adsorbed condensed hydrocarbons will be vaporized and removed from the adsorber; means including a condenser for separating and condensing the vaporized hydrocarbons carried by said activating medium after its passage through said adsorber; a series of flash separators; a conduit connecting the first flash separator of said series of flash separators and said condenser and having a pressure reducing valve therein adapted to be set to reduce the pressure of the liquid passing from the condenser to said first separator to a predetermined pressure so that predetermined volatile components of the liquid will flash into vapor in the first separator; a plurality of conduits for the passage of unvaporized liquid from one separator to the other, one connecting each of said flash separators with the preceding flash separator in said series of flash separators and having a pressure reducing valve therein adapted to be set to reduce the pressure of the liquid passing therethrough to a predetermined pressure; a plurality of compressors, each connected to one of said flash separators for withdrawing the overhead vapors therefrom, compressing the withdrawn vapor and sending it to the compressor associated with the preceding flash separator in said series of flash separators; a second condenser connected to receive the compressed vapors from the compressor associated with the first flash separator in said series of flash separators for condensing any liquid phase formed in the compressed withdrawn vapors; means including a conduit for returning the liquid phase from said second condenser to said first flash separator; means including a conduit for returning the vapor phase from said second condenser to the flow of natural gas on its way to the adsorber; and means including a conduit for withdrawing the stabilized liquid from the last of said series of flash separators.

2. In the recovery of condensable hydrocarbons from natural gas involving the contact of adsorbent material with the gas with resultant adsorption of the condensable hydrocarbons by the adsorbent material and the subsequent treatment of the adsorbed material with a heated medium to vaporize and remove the condensable hydrocarbons and thereby reactivate the adsorbent material for further contact with the natural gas and the subsequent condensation of the desorbed hydrocarbons under high pressure in a condensing zone to liquefy the hydrocarbons, the improvement which comprises directing a continuous flow of the hydrocarbon liquid mixture from the condensing zone directly and in succession into and through a series of flash separating zones; reducing the pressure of the liquid mixture to a predetermined pressure prior to its entry into each of the flash separating zones, whereby only predetermined volatile components of the liquid mixture will flash into vapor in each of the separating zones; continuously withdrawing, combining and compressing the overhead vapors from all of said separating zones; continuously directing the flow of the compressed combined withdrawn overhead vapors through a second condensing zone and there removing any liquid phase formed during compression and returning it to the first of said flash separating zones; continuously withdrawing the vapor phase from said second condensing zone and sending it to join the natural gas on its way to be treated; and continuously withdrawing the liquid from the last of said flash separating zones as the finished product.

References Cited in the file of this patent
UNITED STATES PATENTS

| | | |
|---|---|---|
| 2,214,678 | Raigorodsky | Sept. 10, 1940 |
| 2,250,925 | Babcock | July 29, 1941 |
| 2,303,609 | Carney | Dec. 1, 1942 |
| 2,307,024 | Carney | Jan. 5, 1943 |
| 2,645,104 | Kniel | July 14, 1953 |
| 2,784,798 | Miller et al. | Mar. 12, 1957 |